3,483,296
Patented Dec. 9, 1969

3,483,296
METHOD OF CAMBATTING MICROORGANISMS WITH BENZYLTHIOUREAS
Henry Martin and Dieter Duerr, Basel, Hans Rudolf Hitz, Muttenz, and Marcus von Orelli, Munchenstein, Switzerland, assignors to Ciba Limited, Basel Switzerland, a company of Switzerland
No Drawing. Filed Mar. 22, 1966, Ser. No. 536,266
Claims priority, application Switzerland, Mar. 25, 1965, 4,205/65
Int. Cl. A01n 9/12
U.S. Cl. 424—322     3 Claims

ABSTRACT OF THE DISCLOSURE

Biocidal preparations which contain as active principle at least one compound of the general formula

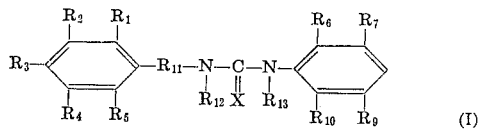
(I)

in which X is oxygen or sulphur, $R_1$ to $R_{10}$ may be identical or different and each is hydrogen, halogen, lower alkyl, alkoxy, alkylthio, aryl aryloxy, arylthio, —CN, —SCN, —$NO_2$,

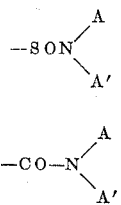

or

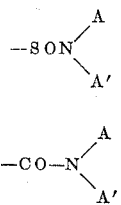

group, in the last two groups A or A' being hydrogen or alkyl, provided that at least two of the substituents $R_1$ to $R_5$ and $R_6$ to $R_{10}$ are not hydrogen, and in which $R_{11}$ is a straight-chain or branched alkylene radical having 1 to 4 carbon atoms and $R_{12}$ and $R_{13}$ each is hydrogen or lower alkyl, and, if desired, one or more of the following additives: emulsifiers, dispersing agents, wetting agents, adhesives and fertilizers, as well as other known biocidal preparations.

---

The present invention provides biocidal preparations which contain as active principle at least one compound of the general formula

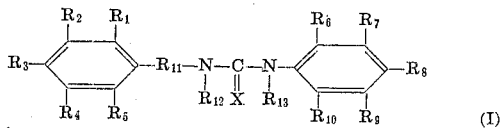
(I)

in which X represents an oxygen atom or a sulphur atom, $R_1$ to $R_{10}$ may be identical or different and represent a hydrogen or halogen atom or a low alkyl, alkoxy, alkylthio, aryl, aryloxy, arylthio, —CN, —SCN, —$NO_2$,

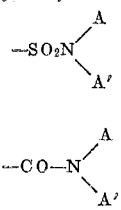

or

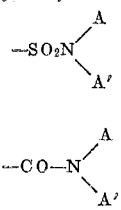

group, in the last two groups A or A' representing a hydrogen atom or an alkyl group, provided that at least two of the substituents $R_1$ to $R_5$ and $R_6$ to $R_{10}$ do not represent hydrogen atoms, and in which $R_{11}$ represents a straight-chain or branched alkylene radical having 1 to 4 carbon atoms and $R_{12}$ and $R_{13}$ each represents a hydrogen atom or a low alkyl group, and, if necessary, one or more of the following additives: emulsifiers, dispersing agents, wetting agents, adhesives and fertilizers, as well as other known biocidal preparations.

The term "low" as applied to alkyl groups, alkoxy groups and alkyl-thio groups as indicated above, means groups each having a maximum of 4 carbon atoms.

The urea compounds of the Formula I are lethal to many kinds of harmful organisms, for example, they act as insecticides, vermicides, acaricides, bactericides, fungicides and herbicides.

For example, urea compounds of the Formula I may be used for protecting keratinous material from attack by insects.

In aqueous dispersion, they have affinity for keratin fibres and protect material to which they are applied from moth larvae and certain kinds of beetle (for example, fur beetle and carpet beetle). The urea compounds of the invention corresponding to the Formula I can also be used as disinfectants and for the disinfectant cleaning of objects, for example, material containing cellulose. Such urea compounds can also be processed into textile detergents and toilet soaps.

The urea compounds of the Formula I are also highly effective against molluscs. Preparations having a specially powerful action against bacteria, harmful fungi and moths are those which contain as active principle at least one compound of the Formula I in which at least two of the substituents $R_1$ to $R_5$ and $R_6$ to $R_7$ are halogen atoms, especially chlorine atoms and/or methyl groups, X represents an oxygen atom or a sulphur atom, $R_{11}$ represents a methylene or ethylene bridge and $R_{12}$ and $R_{13}$ represent hydrogen atoms.

The active principles of the Formula I have hitherto not been described in the literature; they can be prepared by the usual processes for making urea. They can be obtained, for example, by reacting a compound of the formula

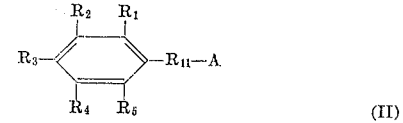
(II)

with a compound of the formula

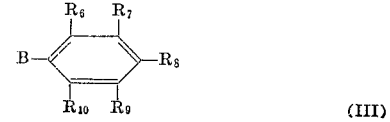
(III)

in which formulae the symbols A and B represent radicals which are capable of forming the urea or thiourea bridge of the formula

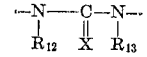

by condensation or addition. In general, the process is carried out by treating a reactive derivative of carbonic acid or thiocarbonic acid with an amine of the formula

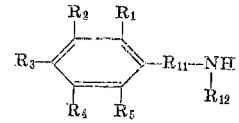
(IV)

and an amine of the formula

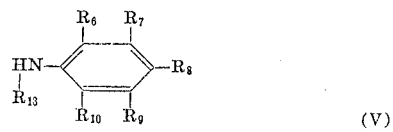
(V)

in any desired sequence.

For example, an amine (IV) or an amine (V) may be reacted with phosgene or thiophosgene and the carbamic acid halide or isocyanate formed—especially in cases where $R_{12}$ or $R_{13}$ represent hydrogen—is reacted with the other amine (V) or (IV).

Instead of phosgene, a halogenated carbonic acid ester, for example, an alkyl or aryl ester may be reacted with amine (IV) or (V), and the carbamate formed reacted with amine (V) or (IV).

Furthermore, it is possible to react an amine (IV) or (V) with an alkaliisocyanate in acid solution to form an N',N'-unsubstituted urea and to transamidate the latter with amine (V) or (IV) to form the desired urea of the Formula I.

The transamidation may be carried out in the presence or absence of solvents. Suitable solvents are, for example, ortho-dichlorobenzene, anisol and phenol. In principle, thioureas can be prepared in the same manner as ureas. For example, the desired ureas are obtainable by reacting phenyl-isothiocyanates with benzyl-ethylamines, phenyl-ethylamines, and so forth.

It is also possible, for example, to use as starting materials the precursors of isocyanates, for example, N-halogen-carboxylic acid amides or carboxylic acid azides, and react them with the desired anilines.

Suitable anilines are, for example, 3,4-dichloraniline, 3,5-dichloraniline, 3,4,5-trichloraniline, 2,4,5-trichloraniline, 3-chloro-4-methoxyaniline, 3-chloro-4-methylaniline, 4 - amino-3,5-dichloro- or 3,5 - dibromobenzene-sulphonamide, 2,4 - dinitraniline, 2,4-dinitro-6-chloraniline and 2,4-dimethylaniline.

Suitable phenylalkylamines are 3,4 - dichlorobenzylamine, 3,4-dibromobenzylamine, 2,4-dichlorobenzylamine, 2,5-dimethylbenzylamine, 3,4-dimethylbenzylamine.

Instead of the benzylamines, it is also possible to use the corresponding α-phenylethylamines, β-phenylethylamines, β-phenylpropylamines or γ-phenylpropylamines.

As has already been mentioned above, the new urea compounds of the invention are very suitable for use in combating harmful organisms of the vegetable and animal kingdom. In particular, the new compounds are effective against bacteria, fungi, fungus spores, worms, insects, snails, and so forth. The urea compounds of the invention are thus broad-spectrum pesticides.

A special advantage of the new urea compounds is that they have no toxic side-effects on crop plants or warm-blooded animals when used in the concentration necessary for antiparasitic use. Accordingly, the new urea compounds may be used in a great variety of ways for combating harmful organisms, for example, they may be used in plant protection, wood protection, the preservation of a very wide variety of industrial products, for protecting fibrous materials from harmful microorganisms, for preserving agricultural products, as disinfectants in veterinary medicine, in general hygiene and in personal hygiene.

A factor of particular importance is that the urea compounds of the invention do not lose their bactericidal and fungicidal action in the presence of albuminous substances and soaps. The new compounds have no offensive odour and are well tolerated by healthy skin.

As examples of the use of the new compounds in the field of plant protection, there may be mentioned the treatment of seeds and fully-grown or partly-grown plants as well as the treatment of the soil in which the plants grow in order to combat harmful organisms, especially harmful fungi, fungus spores, bacteria, nematodes and insects, it again being stressed that the new compounds have no phytotoxic side-effects when used in the concentrations required for the foregoing purposes.

Examples of industrial products that may be preserved or disinfected with the new urea compounds are textile auxiliaries and finishes, glues, binders, paints, thickenings, colour pastes and printing pastes and similar preparations based on organic or inorganic dyestuffs or pigments, including those containing casein or other organic compounds as additives. It is also possible to protect wall paints and ceiling paints, for example, paints containing colour binders containing albumin, from attack by harmful organisms by the addition of the new compounds.

The new urea compounds may also be used for the protection of fibres and textiles. They have affinity for natural and synthetic fibres, and when applied to such materials they are permanently effective against harmful organisms, for example, fungi, bacteria and insects. The urea compounds may be applied prior to, simultaneously with or subsequent to a treatment of these textiles with other substances, for example, colour or print pastes or finishes. The urea compounds of the invention are especially efficient at protecting wool fibres from moths and other feeding pests for example, they are outstandingly effective against moth larvae when applied to the fibre in the form of a solution in acetone or from an aqueous bath in the presence of an emulsifier.

The new urea compounds can also be used as conserving agents in the pulp and paper industries, for example, to prevent the formation of slime in paper-making plant caused by microorganisms.

The invention also provides preparations for combating pests, for example, harmful fungi, fungus spores, bacteria, worms, acarids and insects, which preparations contain as active principle at least one of the urea compound of the general Formula I and, if necessary, at least one of the following additives: solvents, solid, liquid or gaseous extenders, adhesives, emulsifiers, dispersing agents, cleansing agents, wetting agents, other pesticides, for example, fungicides, bactericides, herbicides, acaricides and insecticides, and also fertilizers.

Depending on the kind of additive or additives with which the new urea compounds are combined in the preparations of the invention, formulations are obtained that may be specially suitable for cleansing purposes, disinfection or personal hygiene.

For example, detergents and cleansing agents having an excellent antibacterial or antimycotic action are obtained by combining the urea compounds of the invention with detersive or surface-active substances. For example, the compounds of the general Formula I may be worked into soaps or combined with soap-free detersive or surface-active substances.

As examples of soap-free detersive compounds that can be used in admixture with the new urea compounds there may be mentioned: alkylarylsulphonates, tetrapropylbenzene sulphonates, fatty alcohol sulphonates, condensation products of fatty acids and methyltaurine, condensation products of fatty acids and hydroxyethane sulphonates, fatty acid-albumin condensation products, primary alkyl sulphonates, non-ionic products, for example, condensation products of alkylphenols and ethylene oxides, and also cationic compounds. The new carbanilides can also be used in heavy-duty detergents, for example, together with a condensed phosphate, for example, 20 to 50% of alkali-tripolyphosphate, and also in the presence of an organic lyophilic polymeric substance that increases the soil suspending power of the washing liquor, for example, an alkali salt of carboxymethylcellulose (cellulose-glycollic acid).

The antibacterial or antimycotic activity of the new urea compounds is in no way impaired by the addition of detersive compounds, for example, anionic, cationic or non-ionic products; in fact, the surprising observation has been made that, in many cases, combination with such substances increases their efficiency.

Cleansing agents having a disinfectant action obtained in this manner can be used, for example, in laundries. It is advantageous in this application that the new urea compounds, when used in an appropriate concentration, are taken up by the fibrous material during the washing process and impart to the goods a permanent antibacterial and antimycotic finish. Textiles treated in this manner, provide protection from perspiration odour, as caused by microorganisms.

In addition to their use in laundries, the cleansing preparations of the invention which contain the urea compounds of the general Formula I may be used, for example, as industrial cleansers or household cleansers, and also in the food trade, for example, in dairies, breweries and slaughterhouses, in agriculture and in veterinary hygiene.

The compounds of the invention can also be used as constituents of preparations used for cleansing or disinfection in hospitals and medical practice; for example, they can be used in the washing of hospital linen and in the cleaning of wards and apparatus. If necessary, the new compounds can be combined with other disinfectants and antiseptic products, it thus being possible to meet all the requirements of a specific cleaning or disinfecting job. An especially important factor is that the new urea compounds do not lose their power to combat microorganisms in the presence of blood or serum.

The new urea compounds, if necessary, together with other bactericidal or fungicidal substances, barrier substances, and the like, can also be used in preparations for cleansing the skin, for example, the hands, which preparations are required to have antibacterial or antimycotic properties, such preparations being used, in particular, in medical practice. They can also be used to combat offensive body odour, which is caused by microorganisms. When the new compounds are used for this purpose, it is an advantage that they do not irritate healthy skin and that they do not have an offensive odour, as is the case, for example, with chlorinated phenols.

As biocidal additives which may be present in the preparations of the invention in addition to the urea compounds of the Formula I there may be mentioned, for example, 3,4-dichlorobenzylalcohol, ammonium compounds, for example, diisobutylphenoxyethoxy-dimethylbenzylammonium chloride, cetylpyridinium chloride, cetyltrimethylammonium bromide, halogenated dihydroxydiphenylmethanes, tetramethylthiouramdisulphide, 2,2-thio-bis-(4,6-dichlorophenol) and also organic compounds which contain a thiotrichloromethyl group, salicylanilides, dichlorosalicylicanilides, dibromosalicylicanilides, tribromosalicylicanilide, dichlorocyanuric acid, tetrachlorosalicylicanilides, aliphatic thiouramsulphides and hexachlorophene (2,2'-dihydroxy-3,5,6-3',5',6'-hexachlorodiphenylmethane).

The preparations of the invention having disinfectant properties may also contain additives for example antioxidants, sun-screen agents, fluorescent brighteners, softeners, perfumes, and the like.

By processing the new urea compounds with substances commonly used in personal hygiene, it is possible to produce compositions which are specially suitable for cosmetic purposes.

The preparations of the invention, which contain the compounds of the general Formula I, can be made up in a very wide variety of forms, in accordance with the many purposes for which they can be used. They can, for example, be in the form of solid, semi-solid and liquid soaps, or pastes, powders, emulsions, suspensions, solutions, in organic solvents, or sprays, powders, granules, tablets, sticks, in capsules made of gelatin or other materials, in the form of ointments, skin creams and shaving creams, mouth washes, liquid, semi-solid or solid dentifrice and other substances used in the care of teeth, in shampoos and other products for the treatment of the hair.

The biocidal action of the urea compounds that can be prepared by the process of the invention can also be imparted to articles made from plastic materials. When plasticizers are used it is advantageous to add the dissolved or dispersed urea compound to the plasticizer for incorporation in the plastic material; plasticizers used are, for example, dimethyl phthalate, diethyl phthalate, dibutyl phthalate, dicyclohexyl phthalate, trihexyl phthalate, dibutyl adipinate, benzylbutyl adipinate, aliphatic sulphonic acid esters and triglycol acetate. The urea compound is advantageously well dispersed in the plastic material. Plastic materials having germ-repellent properties can be used for a very wide variety of articles that are required to resist germs of all kinds, for example, rot bacteria or skin fungi, such articles being, for example, mats, handles, door fittings, seats, duckboards in swimming baths, wall coverings, especially in hospitals, and the like. Floor and furniture polishes having disinfectant and insecticidal properties can be produced by incorporation of the urea compounds of the invention.

The following examples illustrate the invention.

EXAMPLE 1

21.3 grams of 3,4-dichlorobenzylamine hydrochloride and 14 ml. of triethylamine are added to 150 ml. of acetonitrile. 20.4 grams of 3,4-dichlorophenylisothiocyanate in 20 ml. of acetonitrile are added dropwise, while stirring, to the suspension so formed. The temperature rises to about 35° C. and the contents of the flask become clear. After about 2 hours, the reaction solution is stirred into about 500 ml. of water. The precipitate that forms is collected and then recrystallized from alcohol. Yield: 33 grams; melting 133.5 to 134° C.

Further urea or thiourea compounds of the formula $$R-NH-C-NH-R_1$$
$$\parallel$$
$$X$$

can be prepared in the manner described in the above example.

| Number | R | R₁ | Melting point, °C. | |
|--------|---|-----|-------|-------|
|        |   |     | X=O   | X=S   |
| 1, 2   | CH₃-⟨C₆H₃(CH₃)⟩-CH₂-CH₂- | Cl-⟨C₆H₃Cl⟩- | 143–144 | 129–130 |
| 3, 4   | Same as above. | Cl-⟨C₆H₃Cl₂⟩- | 186–187 | 74–75 |
| 5, 6   | Same as above. | Cl-⟨C₆H₃(CH₃)⟩- | 203 | 112–114 |
| 7, 8   | CH₃-⟨C₆H₃(CH₃)⟩-CH₂- | Cl-⟨C₆H₃Cl⟩- | 197–198 | 125–126 |

|  |  |  | Melting point, °C. | |
|---|---|---|---|---|
| Number | R | R₁ | X=O | X=S |
| 9, 10 | Same as above. | 2,4,5-trichlorophenyl | 226–227 | 175–176 |
| 11, 12 | Same as above. | 2,4-dichlorophenyl | 216–217 | 157–158 |
| 13 | 2,5-dimethylbenzyl (CH₃-C₆H₃(CH₃)-CH₂–) | 4-nitro-2-methyl-6-chlorophenyl | 229–230 | |
| 14, 15 | Same as above. | 4-chloro-2-methylphenyl | 230 | 227–228 |
| 16 | Same as above. | 4-chloro-2-methoxyphenyl | 177–178 | |
| 17 | Same as above. | 2,4-dimethoxyphenyl | 203–204 | |
| 18, 19 | 3,4-dimethoxybenzyl (CH₃O-C₆H₃(OCH₃)-CH₂–) | 2,6-dichlorophenyl | 164 | 160 |
| 20 | Same as above. | 2,4-dichlorophenyl | 205–206 | |
| 21 | Same as above. | 2,4,5-trichlorophenyl | 208–209 | |
| 22 | Same as above. | 2-methyl-4-nitrophenyl | 174 | |
| 23 | Same as above. | 2-methyl-4-chlorophenyl | 164–165 | |
| 24 | Same as above. | 2-chloro-4-methoxyphenyl | 176–177 | |
| 25 | 2,5-dimethylbenzyl | 2,6-dichlorophenyl | | 153–154 |
| 26 | Same as above. | 2,4-dichlorophenyl | | 171–172 |
| 27 | Same as above. | 4-chloro-2-methylphenyl | | 140–141 |
| 28 | Same as above. | 2-chloro-6-methylphenyl | | 116.5–117.5 |

| Number | R | R₁ | Melting point, °C. X=O | Melting point, °C. X=S |
|---|---|---|---|---|
| 29, 30 | 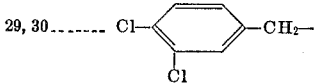 | 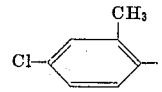 | 236–237 | 143 |
| 31, 32 | Same as above. | 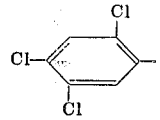 | 242–243 | 197 |
| 33 | Same as above. | 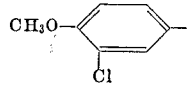 | 206 | |
| 34 | Same as above. | 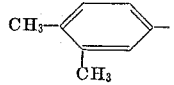 | 191 | |
| 35 | Same as above. | 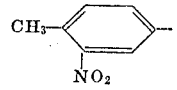 | 228–229 | |
| 36 | Same as above. | 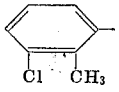 | 231.5 | |
| 37 | 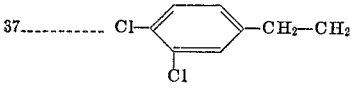 | 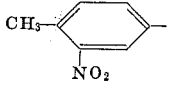 | 152–153 | |
| 38 | Same as above. | 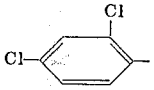 | 193–194 | |
| 39, 40 | Same as above. | 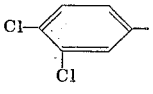 | 165–166 | 98–99 |
| 41 | Same as above. | 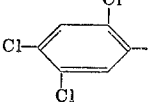 | 211–212 | |
| 42 | Same as above. | 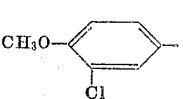 | 158 | |
| 43 | Same as above. | 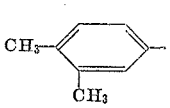 | 155 | |
| 44, 45 | 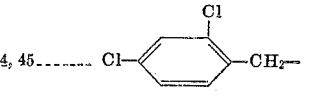 | 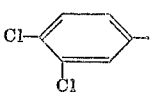 | 217–218 | 158–159 |
| 46 | Same as above. | 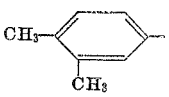 | 207–208 | |
| 47 | Same as above. | 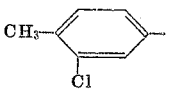 | 185–186 | |

| Number | R | R₁ | Melting point, °C. | |
|---|---|---|---|---|
| | | | X=O | X=S |
| 48, 49 | 3,4-Cl₂-C₆H₃-CH₂-CH₂- | 3,4-Cl₂-C₆H₃- | 176-177 | 120-121 |
| 50 | Same as above. | 3,4-(CH₃)₂-C₆H₃- | 176.5-177.5 | |
| 51, 52 | 2,6-Cl₂-C₆H₃-CH₂- | 3,4-Cl₂-C₆H₃- | 237-238 | 191-192 |
| 53 | Same as above. | 3,4-(CH₃)₂-C₆H₃- | 239-240 | |
| 54 | Same as above. | 4-Cl-3-CH₃-C₆H₃- | 235-236 | |
| 55, 56 | 2,4-Cl₂-C₆H₃-CH₂-CH₂- | 3,4-Cl₂-C₆H₃- | 213-214 | 163-164 |

N-3,4-dichlorobenzyl-N-methyl-N'-3,4-dichlorophenylurea melting at
57    107 to 108° C.
58    thiourea melting at 168 to 170° C.
N-3,4-dichlorobenzyl-N-methyl-N'-3,4-dichlorophenylurea
59    melting at 103° C.
60    thiourea melting at 137° C.
61    N-3,4-dichlorobenzyl-N'-3,4-dichlorophenylurea melting at 200 to 201° C.

EXAMPLE 2

The new urea and thiourea compounds of the Formula I have a powerful action on gram-positive bacteria, especially Staphylococci and Streptococci. They are also effective against pathogenic fungi, for example, *Trichophyton interdigitale*.

The antibacterial activity was determined in the following manner by a dilution test:

Bacteriostatic and bactericidal activity 20 milligrams of active principle are dissolved in 10 ml. of propyleneglycol, and 0.25 ml. of the solution is added to 4.75 ml. of sterile glucose broth; the solution is then diluted 1:10 in the test tubes. The solutions are inoculated with *Staphylococcus aureus* and incubated for 48 hours at 37° C. (bacteriostatic activity). After 24 hours a specimen was taken from each of the cultures, spread on glucose-agar plates and incubated for 24 hours at 37° C. (bactericidal activity). After the time stated, the following threshold concentrations (p.p.m.) for bacteriostatic and bactericidal activity were determined:

| | *Staphylococcus aureus* | |
|---|---|---|
| | Bacteriostatic act. | Bactericidal act. |
| Compound No.: | | |
| 40 | 0.3 | 0.3 |
| 45 | 0.1 | 0.1 |
| 48 | 0.3 | 0.3 |
| Example No. 1 | 0.3 | 0.1 |
| 30 | 3 | 10 |
| 8 | 1 | 3 |
| 4 | 10 | 300 |
| 1 | 3 | 300 |
| 46 | 300 | 100 |

| | Fugistatic acitvity | |
|---|---|---|
| | *Rhizopus nigricans* | *Aspergillus niger* |
| Compound No.: | | |
| 45 | 100 | |
| 49 | 30 | 30 |
| 27 | 100 | 100 |
| 48 | 100 | 100 |
| 26 | 100 | 100 |
| 45 | 100 | 100 |
| 6 | 100 | |

The fungistatic activity was determined in test-tubes with sterile beer wort solutions (10%) in decreasing concentrations. The preparations of active substance were produced in the manner described in the test for antibacterial activity. After inoculation with *Aspergillus niger* and *Rhizopus nigricans*, the cultures were incubated for 72 hours at 25° C. and the threshold concentrations determined (p.p.m.).

EXAMPLE 3

A cotton fabric was treated with 0.1% of the compound prepared in the manner described in Example 1. Circular patches having a diameter of 10 mm. were punched out of the cotton, placed on a glucose-agar plate inoculated with *Staphylococcus aureus* and incubated for 24 hours at 370 C. The zone of no growth (ZNG in mm.) round the patches was measured. The patches were removed and microscopic examination was made to establish whether any growth of bacteria had taken place (G in percent).

This test was carried out with untreated specimens and with specimens that had been treated with water for 24 hours at 29° C. (standard test recommended by the Federal Testing and Research Institute).

| Staphlococcus jaureus | | | |
|---|---|---|---|
| Untreated | | Treated with water | |
| ZNG (mm.) | G (percent) | ZNG (mm.) | G (percent) |
| 2 | 0 | 1 | |

EXAMPLE 4

The compounds Nos. 45, 8 and 49 of the thiourea of Example 1 and also the compounds Nos. 57, 61, 59, 30 and 40 have been found to have a powerful molluscicidal action.

EXAMPLE 5

Wool muslin is impregnated with an alcohol solution (30 grams of test substance per litre) of the substance to be tested and the fabric is then dried on a stenter.

A moth-resistance test carried out on the wool fabric yielded the following figures:

| | Efficacy in percent |
|---|---|
| Untreated | 0 |
| Treated with alcohol | 3.3 |
| Compound of Example 1 | 94.1 |
| Compound No. 40 | 93.1 |
| Compound No. 45 | 90.8 |
| Compound No. 2 | 86.7 |

What is claimed is:

1. A method for combating microorganisms which comprises applying to the area where the said effect is desired a biocidally effective amount of the compound of the formula

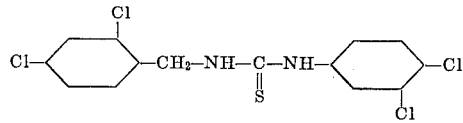

2. The method for combating microorganisms which comprises applying to the area where the said effect is desired a biocidally effective amount of the compound of the formula

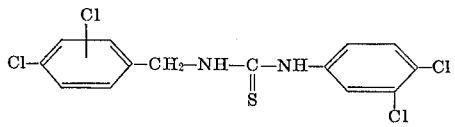

3. The method for combating microorganisms according to claim 2 which comprises applying to the area where the said effect is desired a biocidally effective amount of the compound of the formula

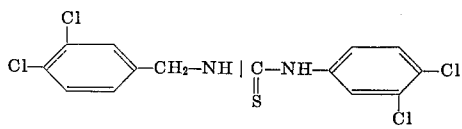

References Cited

UNITED STATES PATENTS

| 2,338,380 | 1/1944 | Hester et al. | 167—30 |
| 2,749,270 | 6/1956 | Garber | 167—30 |
| 3,090,810 | 5/1963 | Berger et al. | 260—552 |
| 3,110,712 | 11/1963 | Hill et al. | 260—552 |
| 3,135,748 | 6/1964 | Sheehan et al. | 260—552 |
| 3,175,896 | 3/1965 | Arndt et al. | 167—33 |
| 3,188,312 | 6/1965 | Gundel et al. | 260—552 |
| 3,242,208 | 3/1966 | Martin | 260—552 |
| 3,280,185 | 10/1966 | Wendt | 260—552 |
| 3,293,293 | 12/1966 | Dreier et al. | 260—552 |

OTHER REFERENCES

Kharida et al.: Chem. Abs., 1961, pp. 10372–10373.

ALBERT T. MEYERS, Primary Examiner

D. R. MAHANAND, Assistant Examiner

U.S. Cl. X.R.

71—120; 106—15, 124, 138; 117—141, 143, 152; 252—106; 260—454, 465, 552, 553; 424—37, 49, 70, 73

CASE 5658/E

PO-1050
(5/69)

UNITED STATES PATENT OFFICE
CERTIFICATE OF CORRECTION

Patent No. 3,483,296          Dated   December 9, 1969

Inventor(s)  HENRY MARTIN ET AL

It is certified that error appears in the above-identified patent and that said Letters Patent are hereby corrected as shown below:

Column 1, line 2, "cambatting" should read --- combatting ---;

Column 5, line 35, delete "diisobutylphenoxyethoxy-" and insert --- diisobutylphenoxyethoxyethyl- ---;

Column 6, line 46, after "melting" insert --- point ---; last line, delete

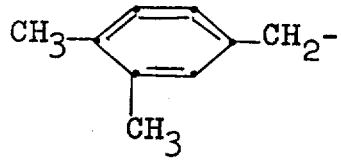

and insert ---

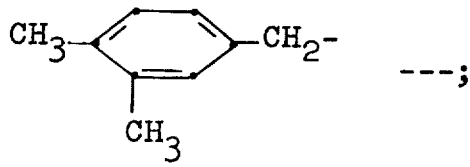 ---;

Column 7, Number 13, delete

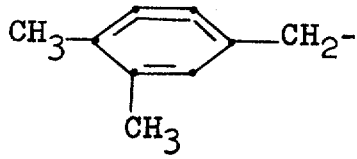

and insert ---

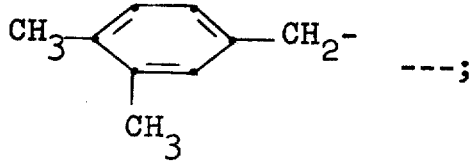 ---;

Column 11, in first chart of Example 2, opposite "Example No. 1" under "Bacteriostatic act." delete "0.3" and insert ---0.1---; Example "46" should read --- 26 ---; "300" should read --- 100 ---; under "Bactericidal act." delete two "300" and in each substitution insert --- 100 ---;

UNITED STATES PATENT OFFICE
CERTIFICATE OF CORRECTION

Patent No. 3,483,296　　　Dated December 9, 1969

Inventor(s) HENRY MARTIN ET AL

It is certified that error appears in the above-identified patent and that said Letters Patent are hereby corrected as shown below:

Column 12, second chart of Example 2, delete "Fugistatic acitvit; and insert --- Fungistatic activity ---; under Compound No. delete "48" and insert --- 28 ---; delete "45" and insert --- 25 ---;
　　　line 67, delete "370 C." and insert --- 37° C. ---;
Column 13, line 5, under "G (percent)" insert --- 0 ---;

Column 14, line 15, delete the formula and insert ---

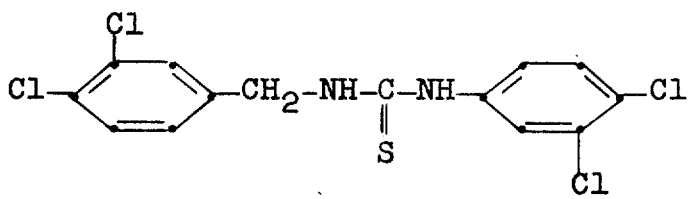

---.

MAR 9 1971

(SEAL)
Attest:

Edward M. Fletcher, Jr.
Attesting Officer

WILLIAM E. SCHUYLER, JR.
Commissioner of Patents